(12) United States Patent
Slevin

(10) Patent No.: US 11,595,765 B1
(45) Date of Patent: Feb. 28, 2023

(54) HEARING ENHANCEMENT DEVICE

(71) Applicant: Richard S. Slevin, Los Altos Hills, CA (US)

(72) Inventor: Richard S. Slevin, Los Altos Hills, CA (US)

(*) Notice: Subject to any disclaimer, the term of this patent is extended or adjusted under 35 U.S.C. 154(b) by 0 days.

(21) Appl. No.: 17/121,634

(22) Filed: Dec. 14, 2020

Related U.S. Application Data

(60) Provisional application No. 62/947,461, filed on Dec. 12, 2019.

(51) Int. Cl.
*H04R 25/00* (2006.01)
*G06F 3/16* (2006.01)

(52) U.S. Cl.
CPC ............ *H04R 25/505* (2013.01); *G06F 3/162* (2013.01); *H04R 25/554* (2013.01); *H04R 2420/07* (2013.01); *H04R 2420/09* (2013.01)

(58) Field of Classification Search
CPC . H04R 25/554; H04R 25/505; H04R 2420/09
See application file for complete search history.

(56) References Cited

U.S. PATENT DOCUMENTS

2019/0097362 A1\* 3/2019 Haba ................. H01R 27/02

FOREIGN PATENT DOCUMENTS

CN          109076280 A  * 12/2018  ........... G10K 11/175

\* cited by examiner

*Primary Examiner* — Sunita Joshi
(74) *Attorney, Agent, or Firm* — Patent Law Offices Of Michael E. Woods; Michael Woods

(57) ABSTRACT

A system and method for improving hearing enhancement solutions across a wide range of hearing devices, particularly for a wide-range of disparate user-provided hearing devices.

2 Claims, 1 Drawing Sheet

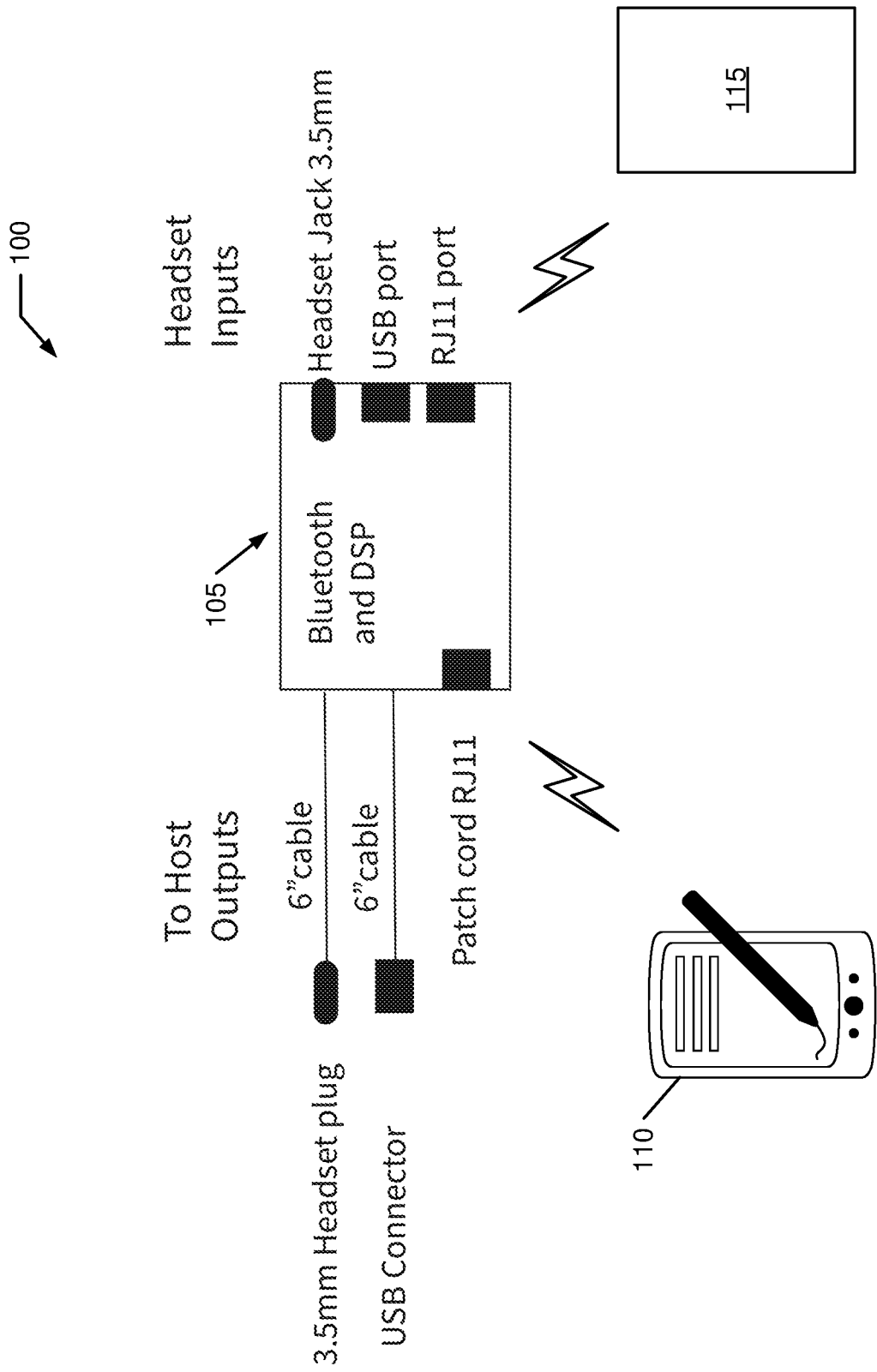

HEARING ENHANCEMENT DEVICE

CROSS REFERENCE TO RELATED APPLICATIONS

This application claims the benefit of U.S. Provisional Application 62/947,461 filed on Dec. 12, 2019, the contents of which are hereby expressly incorporated by reference in its entirety for all purposes.

FIELD OF THE INVENTION

The present invention relates generally to audio systems and methods, and more specifically to a hearing enhancement system generically applicable to a user-worn hearing device having one or more earphones, such as a headset or headphone, wired or wireless, preferably with two or more speakers or audio transducers for stereo.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The growth of consumer electronics has included many different portable computing systems that process audio data for a user. A user interface to such a system often includes a personal audio option which privatizes audiblized data so that only the user may hear. Such options include user-wearable devices that include one or two earphones. Often it is preferred that the audiblized data is presented by the device in stereo (e.g., an earphone for each ear). The earphones may be included in an industrial design for headphones, headsets, ear buds, and the like (collectively hearing devices).

Each user has a hearing profile characterizing how the user will actually perceive and process incoming audible information and a desired profile how the user would like to perceive and process incoming audible information.

Hearing impairment of users sometimes result in use of hearing prosthetics (aids, amplifiers, compressors) to amplify and/or tune ambient or telephonic communications frequencies to partially or wholly compensate for such impairment. A trained audiologist is often recommended to set and manage these prosthetics. It can be inconvenient for users of such prosthetics to use non-prosthetic devices in cooperation with their prosthetic. It can also be inconvenient for such users to avoid using non-prosthetics for any activity.

Often these industrial designs are configured with lightweight and small form factor implementations as a goal. Increasingly there is a desire for advanced functionality in these hearing devices which can be a conflict for the industrial design goals.

There may be several potential conflicts—the more functionality that is included, the hearing device may become less desirable because of cost, size, and or complexity. To minimize costs, it can be difficult to allow for upgradeability so users may need to consider replacing/upgrading their hearing devices more frequently.

As the desirability of these user-enhancements increases, disadvantages of custom interface controls for configuration and operation of enhanced features for different hearing devices may discourage acceptance.

A solution to some of these conflicts may improve user acceptance and expand a market for desirable solutions.

BRIEF SUMMARY OF THE INVENTION

Disclosed is a system and method for improving user acceptance and expanding a market for desirable solutions. The following summary of the invention is provided to facilitate an understanding of some of the technical features related to a hearing enhancement system generically applicable to a user-worn hearing device having one or more earphones, such as a headset or headphone, wired or wireless, preferably with two or more speakers or audio transducers for stereo, and is not intended to be a full description of the present invention. A full appreciation of the various aspects of the invention can be gained by taking the entire specification, claims, drawings, and abstract as a whole.

An embodiment of the present invention may include a standalone interface system for cooperative use with multiple different hearing devices, and in some cases with a computing system. The interface system may include a small housing having a set of "IN" and "OUT" connections conforming to multiple industry standards used by the multiple different hearing devices. For example, these standards may include registered jacks (e.g., RJ11), headphone jacks (e.g., 2.5 mm or 3.5 mm), and USB and the like). Additionally, the housing may include a power plug with an optional rechargeable battery. The housing may also include a Bluetooth module as well as a USB pass through. The Bluetooth module may be paired for use with a hearing device interface application executing on a user-operated computing system (e.g., a mobile computing platform, smartphone, PDA, tablet, laptop, and the like). The application may be used to access, define, and set various user-definable features of the interface system. For example, the interface device may provide for independently controlling left and right equalization (EQ) of any wired or wireless headset. Wired solutions may include signal pass throughs, like a USB headset plugged into the box and then the box is plugged into a laptop or other computer to make PC calls. Same method for RJ headsets plugged into a phone and headsets plugged into any headset device. Bluetooth Wireless headsets/buds, that are true wireless, meaning the left and right channels can be separated, can also work with this system.

The application may allow the user to set each ear, left and right separately with each frequency, thereby allowing for hearing aid or PSAD/PSAP type customized control of sound to each ear independently.

The application may sequence tones in each frequency and the user could adjust the volume until the sound is just perceptible by the user, then move to the next frequency. Once all the frequencies are adjusted on both ears, the interface system may record the setting on the box and that box becomes the enhanced hearing solution and can be used with any headset plugged into it or connected by BT. The BT is a bit different in that the app on the phone would not need the box, but the app would act as a pass through to the wireless headsets/buds.

Embodiments of the present invention may be used for TV listening as well and for audience situations.

The user is enabled to use any hearing device and allow an embodiment of the present invention to control and apply the desired user profile to all the hearing devices. The user need learn but one set of interface controls for any hearing device, including new hearing devices.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 1 illustrates an enhanced hearing device.

DETAILED DESCRIPTION OF THE INVENTION

Embodiments of the present invention provide a system and method for improving hearing enhancement solutions across a wide range of hearing devices, particularly for a wide-range of disparate user-provided hearing devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

FIG. 1 illustrates an enhanced hearing device 100 including an electronics unit 105 and a computing system 110 in communication with unit 105 (wired or wireless communication) and a hearing device 115. Device 100 defines a standalone interface system 105 for cooperative use with multiple different hearing devices 115, and in some cases with a computing system 110. The interface system 105 may include a small housing having a set of "IN" and "OUT" connections conforming to multiple industry standards used by the multiple different hearing devices. For example, these standards may include registered jacks (e.g., RJ11), headphone jacks (e.g., 2.5 mm or 3.5 mm), and USB and the like). Additionally, the housing may include a power plug with an optional rechargeable battery. The housing may also include one or more of a Bluetooth, DSP, and other modules as well as a USB pass through. The Bluetooth module may be paired for use with a hearing device interface application supported by or executing on user-operated computing system 110 (e.g., a mobile computing platform, smartphone, PDA, tablet, laptop, and the like). System 110 may be used to access, define, and set various user-definable features of interface system 105. For example, the interface device 105 may provide for independently controlling left and right equalization (EQ) of any wired or wireless headset 115. Wired solutions may include signal pass throughs, like a USB headset plugged into the box and then the box is plugged into a laptop or other computer to make PC calls. Same method for RJ headsets plugged into a phone and headsets plugged into any headset device. Bluetooth Wireless headsets/buds, that are true wireless, meaning the left and right channels can be separated, can also work with this system.

The system 110 may allow the user to set each ear, left and right separately with each frequency, thereby allowing for hearing aid or PSAD/PSAP type customized control of sound to each ear independently.

The system 110 may sequence tones in each frequency and the user could adjust the volume until the sound is just perceptible by the user, then move to the next frequency. Once all the frequencies are adjusted on both ears, the interface system 105 may record the setting internally (or accessible through a cloud storage for robustness and user-accessibility across multiple units 105 with system 100 becoming the enhanced hearing solution and can be used with any headset plugged into it or connected by BT. The BT is a bit different in that the application on the system 110 may not need unit 105, but the application may act as a pass through to the wireless headsets/buds of device 115.

Embodiments of the present invention may be used for TV listening as well and for audience situations.

The user is enabled to use any hearing device and allow an embodiment of the present invention to control and apply the desired user profile to all the hearing devices. The user need learn but one set of interface controls for any hearing device, including new hearing devices.

Using computing system 110 to set/control system 100 may include one or more of following steps:

1. Plug in a stereo or mono headset 115 into unit 105 (side marked inputs) and the box gets plugged into the host source (output side), like a PC, TV, amplifier, or other electronic audio source device.

2. There is a charge port on unit 105, or unit 105 may be powered from a wall adapter.

3. Setup is via a phone application supported by computing system 110 communicated (preferably wirelessly) to unit via Bluetooth (BT). This needs to be paired.

4. Once paired the application is launched and the setup process begins.

5. The user wears/dons a particular headset 110 to be used.

6. The application may have many implementations, for example one implementation may be set for multiple EQ levels, for instance, 250 Hz, 500 Hz, 1 KHz, 2K Hz, up to 8 KHz.

7. A configuration process is performed by system 110 in cooperation with unit 105 first starts with the left ear and sends a continuous tone or other audible test pattern to headset 115 at the lowest Hz setting. The user then reduces the volume until the sound is at the lowest level of audibility. Then presses to proceed button. Each tone/pattern is then sent, and the user adjusts a volume for each tone/pattern in sequence until all left ear tones/patterns have been set.

8. Once the left ear is completed, the configuration process changes to the right ear and proceeds as described in step 7 above.

9. At the end of the configuration process, system 100 records the user-selected levels (e.g., on the box or in the cloud) and unit 1015 is ready for use.

10. The system 110/application may show the user's hearing loss and preferably automatically boosts volumes in each frequency band to attempt to level the sounds to "normal" hearing.

11. For hearing losses in excess of 20 db, supplementation of such frequencies may be done gradually due to the brain's ability to adjust to the new sounds. This is a time issue and may take weeks or months to bring back normal hearing such as when the loss is severe.

12. Note also that system 100/unit 105 may be used as an intermediate audio interface to a BT headset (not wired to the box) for sources coming from any device you plug into unit 105, or the system 110/application described herein may be used as the hearing aid app for sources coming from a phone.

The system and methods above have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A standalone hearing aid interface system for cooperative use with multiple different hearing devices, and with a computing system, the interface system including a stored program computing system having a processor executing stored program instructions obtained from a memory, execution of the stored program instructions sequence tones in each frequency of a set of frequencies configured to profile a hearing aid response for the user and the interface configured to adjust a volume of each frequency until each sound is just perceptible by the user, then move to a next frequency of the set, and wherein once all the frequencies are adjusted on both ears, the interface system is configured to record the settings on the box as said hearing aid response and that box becomes an enhanced hearing solution configured to apply said hearing aid response to any headset plugged into it or connected by BT.

2. The system of claim 1 wherein a BT implementation includes the processor performing a pass through function for the wireless headsets/buds.

\* \* \* \* \*